(12) United States Patent
Srinivasan et al.

(10) Patent No.: US 10,936,429 B2
(45) Date of Patent: Mar. 2, 2021

(54) SYSTEM AND METHOD FOR A FAST BACKUP OPERATION REMEDIATION DURING A NETWORK DISRUPTION USING A HELPER VIRTUAL MACHINE

(71) Applicant: EMC IP Holding Company LLC, Hopkinton, MA (US)

(72) Inventors: Sharath Talkad Srinivasan, Bengaluru (IN); Suraj Dayanand Vithalkar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

(21) Appl. No.: 16/255,922

(22) Filed: Jan. 24, 2019

(65) Prior Publication Data
US 2020/0241965 A1 Jul. 30, 2020

(51) Int. Cl.
*G06F 11/08* (2006.01)
*G06F 11/14* (2006.01)
*G06F 9/455* (2018.01)
*G06F 16/11* (2019.01)

(52) U.S. Cl.
CPC ...... *G06F 11/1451* (2013.01); *G06F 9/45558* (2013.01); *G06F 16/128* (2019.01); *G06F 2009/45583* (2013.01); *G06F 2009/45595* (2013.01); *G06F 2201/815* (2013.01); *G06F 2201/82* (2013.01); *G06F 2201/84* (2013.01)

(58) Field of Classification Search
CPC ... H04L 67/1095; H04L 43/0805–0847; H04L 43/16; G06F 2009/45562; G06F 2201/815; G06F 2201/82; G06F 2201/84; G06F 2201/855; G06F 11/1458; G06F 2201/1464; G06F 2201/1466
See application file for complete search history.

(56) References Cited

U.S. PATENT DOCUMENTS

| | | | |
|---|---|---|---|
| 8,924,355 B1 * | 12/2014 | Kundzich | G06F 11/1448 707/647 |
| 2007/0186068 A1 * | 8/2007 | Agrawal | G06F 11/1456 711/162 |
| 2009/0276590 A1 * | 11/2009 | Nagaraj | G06F 11/1443 711/162 |
| 2015/0278042 A1 * | 10/2015 | Antony | H04L 41/0668 714/4.11 |
| 2015/0378830 A1 * | 12/2015 | Hoobler, III | G06F 11/1446 707/648 |
| 2016/0266892 A1 * | 9/2016 | Sn | G06F 3/0619 |

* cited by examiner

*Primary Examiner* — Joseph O Schell
(74) *Attorney, Agent, or Firm* — Chamberlain Hrdlicka

(57) ABSTRACT

A method for performing backup operations includes, while performing a backup operation for a virtual machine (VM), detecting a network disruption between a host and a backup storage system, wherein the VM is executing on the host, and, in response to the detection, storing a portion of snapshot of the VM using a helper VM executing on a second host.

20 Claims, 7 Drawing Sheets

SYSTEM AND METHOD FOR A FAST BACKUP OPERATION REMEDIATION DURING A NETWORK DISRUPTION USING A HELPER VIRTUAL MACHINE

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for performing backup operations in accordance with one or more embodiments of the invention. The method includes, while performing a backup operation for a virtual machine (VM), detecting a network disruption between a host and a backup storage system, wherein the VM is executing on the host, and, in response to the detection, storing a portion of snapshot of the VM using a helper VM executing on a second host.

In general, in one aspect, the invention relates to a system in accordance with one or more embodiments of the invention includes a processor and memory comprising instructions, which when executed by the processor perform a method. The method includes, while performing a backup operation for a virtual machine (VM), detecting a network disruption between a host and a backup storage system, wherein the VM is executing on the host, and, in response to the detection, storing a portion of snapshot of the VM using a helper VM executing on a second host.

In general, in one aspect, the invention relates to a non-transitory computer readable medium in accordance with one or more embodiments of the invention includes computer readable program code, which when executed by a computer processor enables the computer processor to perform a method for performing a backup operation. The method includes, while performing a backup operation for a virtual machine (VM), detecting a network disruption between a host and a backup storage system, wherein the VM is executing on the host, and, in response to the detection, storing a portion of snapshot of the VM using a helper VM executing on a second host.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a backup operation. More specifically, embodiments of the invention improve a method for backing up a virtual machine operating on a production host to a backup storage device by performing a method for temporarily storing a portion of a backup in persistent memory (PMEN) in the event that the backup storage device is inaccessible during the backup operation. Embodiments of the invention may monitor the connection between the production host and the backup storage device and reroute the backup to a helper virtual machine after identifying a disruption in the connection. Embodiments of the invention may consolidate the backup using the helper virtual machine.

Figure 1:
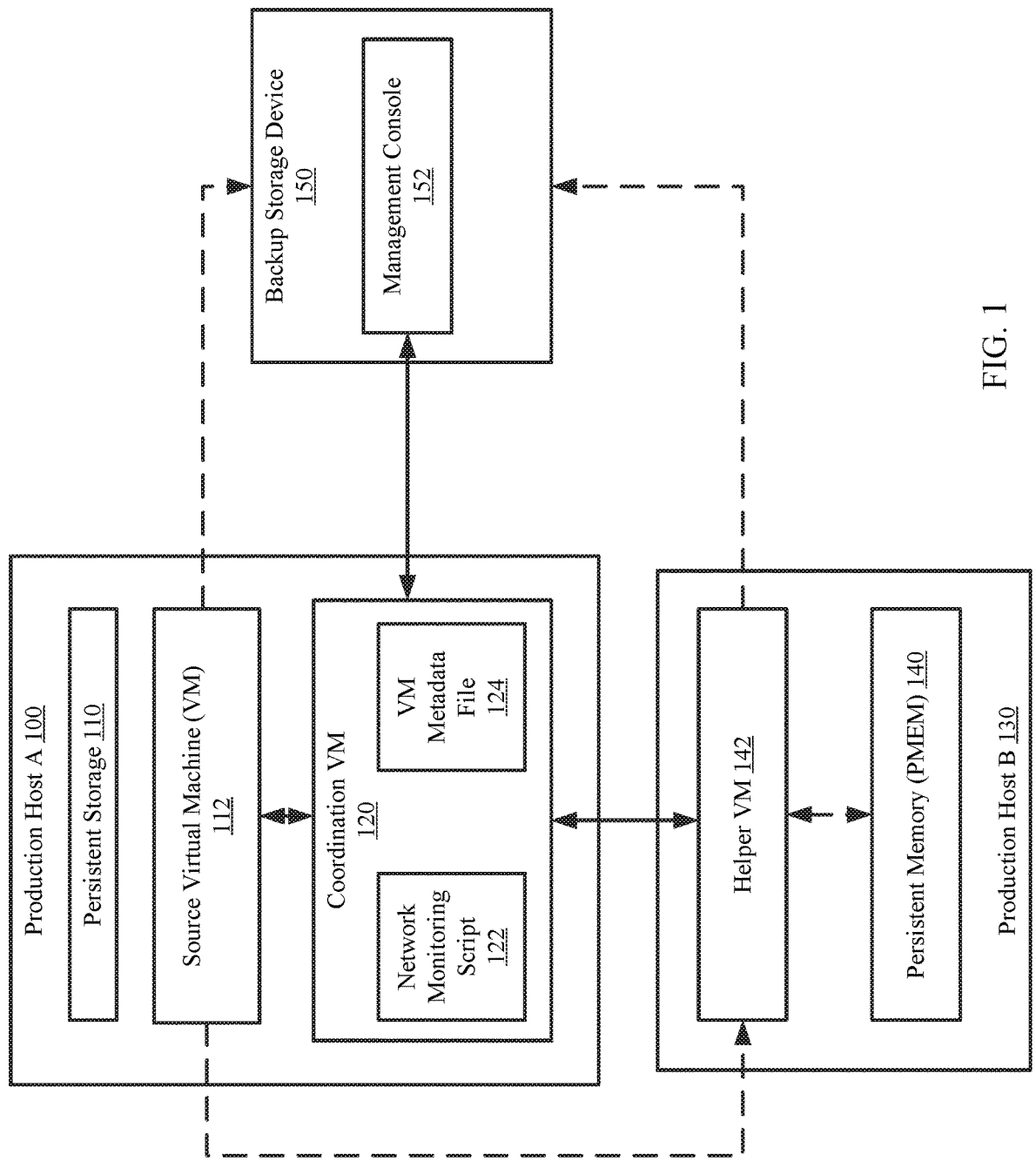
FIG. 1 shows a diagram of a system in accordance with one or more embodiments of the invention.

FIG. 1 shows an example system in accordance with one or more embodiments of the invention. The system includes production hosts (100, 130) and a backup storage device (150). The system may include additional, fewer, and/or different components without departing from the invention. Each component may be operably connected via any combination of wired and/or wireless connections. Each component illustrated in FIG. 1 is discussed below.

In one or more embodiments of the invention, a production host A (100) hosts a number of virtual machines. The virtual machines may include any number of source virtual machines (e.g., 112) and a coordination VM (120). The virtual machines may be logical entities executed using computing resources (not shown) of the production host. Each of the virtual machines may be performing similar or different processes. In one or more embodiments of the invention, the virtual machines provide services to users, e.g., clients (not shown). For example, the virtual machines may host instances of databases, email servers, and/or other applications. The virtual machines may host other types of applications without departing from the invention.

Figure 4:
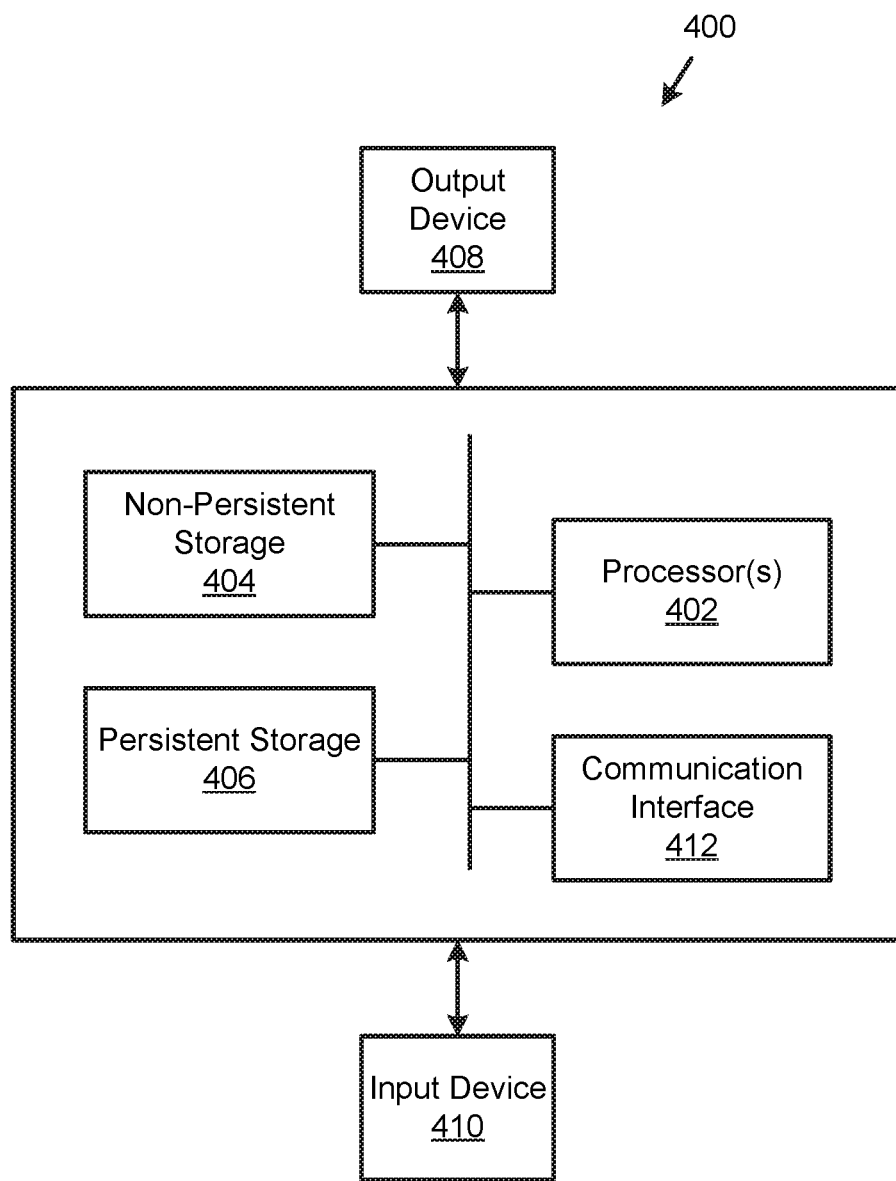
FIG. 4 shows a diagram of a computing device in accordance with one or more embodiments of the invention.

In one or more embodiments of the invention, production host A (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of production host A (100) described throughout this application.

In one or more embodiments of the invention, production host A (100) is implemented as a logical device. The logical device may utilize the computing resources of any number of computing devices and thereby provide the functionality of production host A (100) described throughout this application.

In one or more embodiments of the invention, the persistent storage (110) stores data associated with a source virtual machine (112). The data may be stored in the form of a virtual machine disk. The virtual machine disk may include any number of data segments associated with the source VM (112).

In one or more embodiments of the invention, the persistent storage (110) includes physical data storage devices such as, for example, hard disk drives, solid state drives, tape drives, or any combination thereof. The persistent storage (110) may include or be other types of non-volatile data storage devices without departing from the invention. The persistent storage (110) may be a virtualized storage without departing from the invention.

In one or more embodiments of the invention, the production host (100) includes a coordination VM (120) that orchestrates a backup operation of the source VM (112). The coordination VM (120) may execute a network monitoring script (122) and include a VM metadata file (124). The network monitoring script (122) may be an executable program that is used to monitor the connectivity between the production host (100) and the backup storage device (150) during a backup operation of the source VM (112).

During the backup operation, the coordination VM may create and populate a VM metadata file (124), which specifies information pertaining to the backup operation. The information may be, for example, information about which data has been sent to the backup storage device (150) during the backup operation, the data that still needs to be sent to the backup storage device, etc. The coordination VM may continuously and/or periodically update the VM metadata file while the backup operation is being performed. The coordination VM (120) may also communicate with a helper VM (142) operating in a second production host (130) to remediate the backup operation in the event that connection between the production host (100) and the backup storage device (150) is disrupted during a backup operation.

The coordination VM (120) may communicate with a management console (152) executing in the backup storage device (152) as part of its network monitoring. In one or more embodiments of the invention, the coordination VM (120) communicates with the management console (152) of the backup storage device (150) by sending requests to store data in the backup storage device (150) and obtaining confirmations that the data has been stored. In this manner, the coordination VM (120) may monitor the connectivity between the backup storage device (150) and the production host and update the VM metadata file (1240) after confirmation of data storage is obtained. A confirmation may be obtained after each data segment associated with the source VM (112) is received and stored in the backup storage device.

In one or more of embodiments of the invention, the virtual machines are implemented as computer instructions, e.g., computer code, stored on a persistent storage (e.g., on the production host) that when executed by a processor(s) of the production host (110) cause the production host (100) to provide the functionality of the virtual machines described throughout this application.

In one or more embodiments of the invention, the second production host (142) hosts a helper VM (142) that stores data in persistent memory (PMEM) (140) and aids the backup operation of the source VM (112) in the event that connection is disrupted between the backup storage device and the production host (100) hosting the source VM. In such a scenario, the helper VM (142) is used to store the remaining data to be sent to the backup storage device (150). The remaining data (stored in the helper VM) may be subsequently consolidated with the backup storage system.

In one or more embodiments of the invention, the PMEM (140) in the second production host (130) is a type of non-volatile storage that has a larger storage capacity than volatile memory (e.g., RAM). The PMEM (140) typically has a lower latency than persistent storage (e.g., 110) but a higher latency than RAM. The PMEM (140) may be optimized to store a large amount of data (i.e. a portion of a backup) for a longer period of time relative to storage of data in RAM, but a shorter period of time relative to the storage of data in persistent storage.

In one or more embodiments of the invention, production host B (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of production host B (130) described throughout this application.

In one or more embodiments of the invention, production host B (130) is implemented as a logical device. The logical device may utilize the computing resources of any number of computing devices and thereby provide the functionality of production host B (130) described throughout this application.

In one or more embodiments of the invention, the backup storage device (150) stores backups of virtual machines. The backup storage device (150) may use a management console (152) that includes functionality for managing data obtained from a production host (e.g., 100) associated with the backup. As discussed above, the management console (152) may communicate with the coordination VM (120) of the production host (100) during a backup operation. The management console (152) may communicate with the coordination VM (120) by obtaining requests to store data and sending confirmations of storage after the data is stored.

Figure 2A:
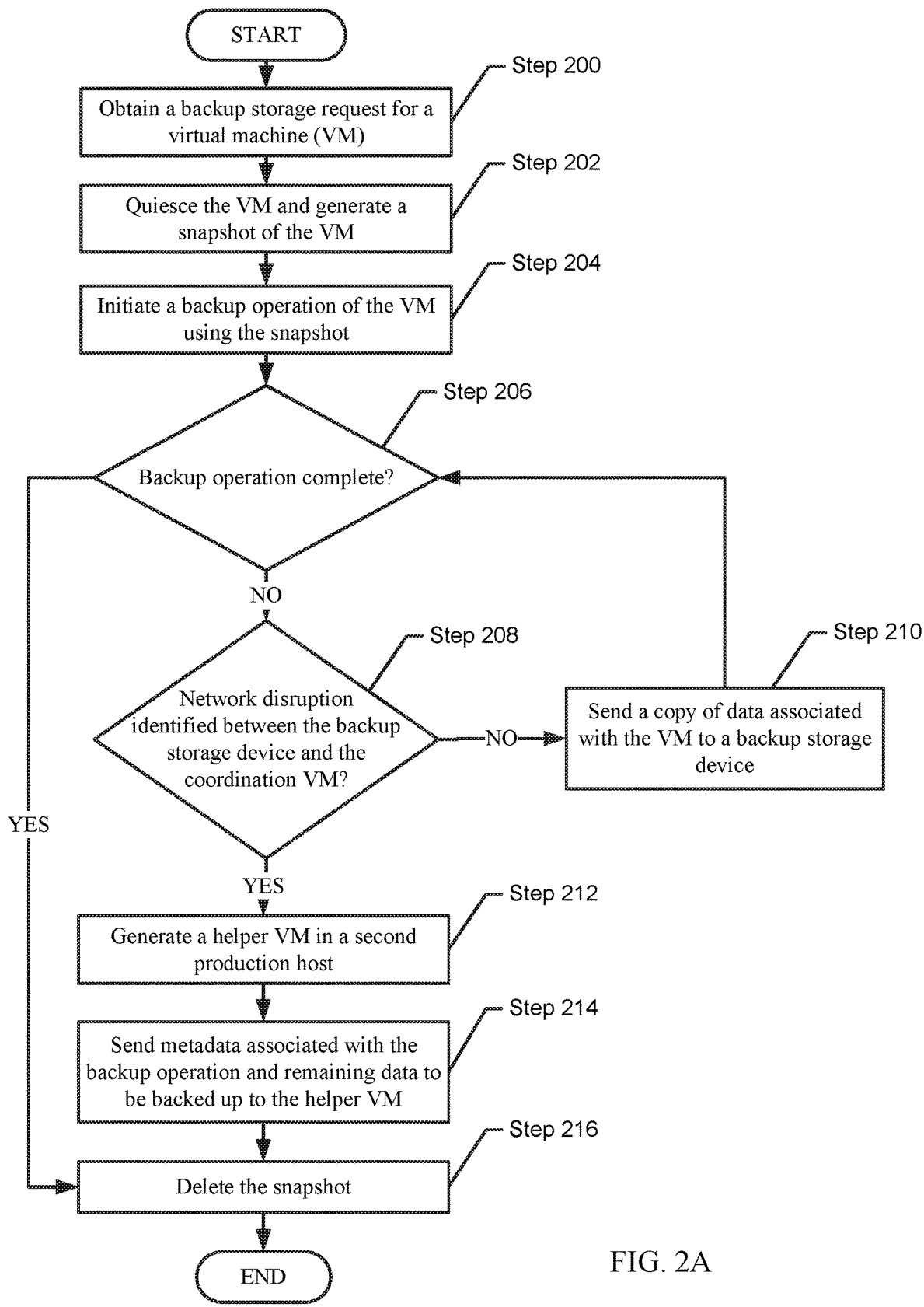
FIG. 2A shows a flowchart for performing a backup operation in accordance with one or more embodiments of the invention.
Figure 2B:
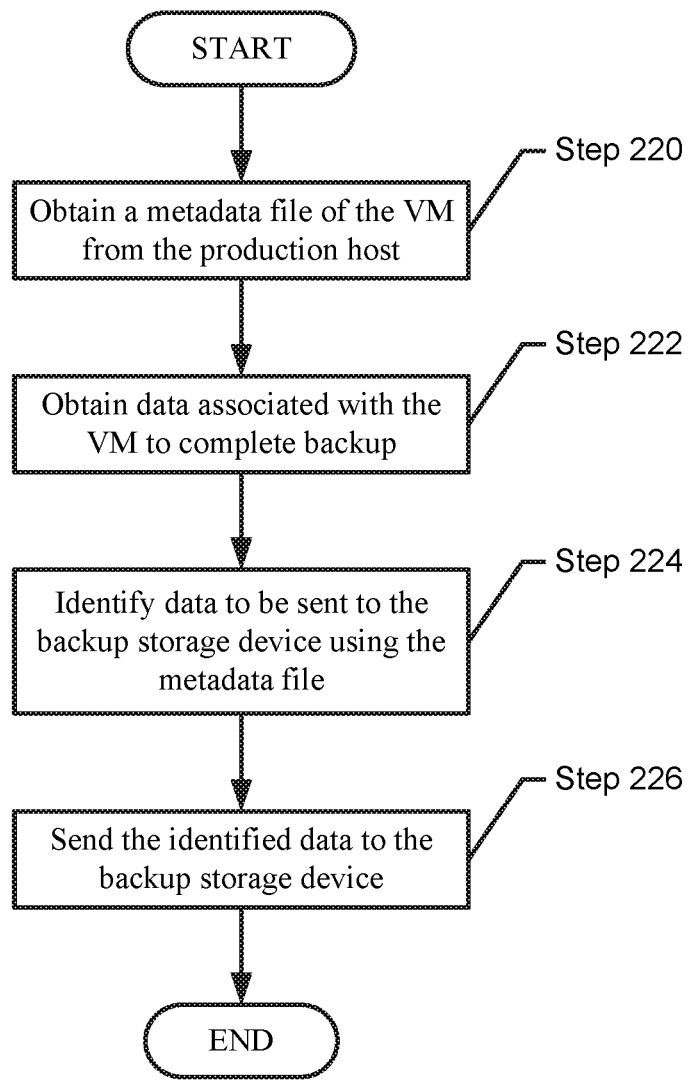
FIG. 2B shows a flowchart for consolidating a backup in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for performing a backup operation in accordance with one or more embodiments of the invention. The method shown in FIG. 2A may be performed by, for example, a coordination VM (120, FIG. 1). Other components of the system illustrated in FIG. 1 may perform the method of FIG. 2A without departing from the invention.

Turning to FIG. 2A, in step 200, a backup storage request for a virtual machine (VM) is obtained. In one or more embodiments of the invention, the backup storage request is issued by, for example, a client requesting to store data in a backup storage device. The VM may be, for example, the source VM (112, FIG. 1) discussed above.

In step 202, the VM is quiesced and a snapshot of the VM is generated. In one or more embodiments of the invention, the VM is quiesced by placing the VM in a quiesced state. In one or more embodiments of the invention, a virtual machine in a quiesced state may be a virtual machine that is prepared for a backup. The VM may be prepared for a backup by applying configurations to the VM that render the VM inactive (e.g., no read or write operations may be performed on the application). In other words, an application is not modified while the application is in the quiesced state. In one or more embodiments of the invention, data associated with an application in a quiesced state may not be accessed.

In one or more embodiments of the invention, a snapshot is a copy of a virtual machine at a point in time. The snapshot may include a copy of references to data associated with the VM. The snapshot may be generated after the VM is placed in a quiesced state. The VM may return to an unquiesced state after the snapshot is obtained.

In step 204, a backup operation of the VM is initiated using the snapshot. The backup operation may be initiated by identifying data to be backed up. The data to be backed up may be the data referenced in the snapshot. The coordination VM may generate a VM metadata file that references data to be backed up.

In step 206, a determination is made about whether the backup operation is complete. The backup operation may be completed when all data in the snapshot is copied to the backup storage. If the backup operation is complete, the method proceeds to step 216; otherwise, the method proceeds to step 208.

In step 208, a determination is made about whether a network disruption between the backup storage device and the coordination VM is identified. If a network disruption is identified, the method proceeds to step 212; otherwise, the method proceeds to step 210.

In one or more embodiments of the invention, the network disruption is identified by executing a network monitoring script that monitors the connection between the production host hosting the coordination VM and the backup storage device. Other methods for detecting a network disruption may be used without departing from the invention. The coordination VM is notified when a disruption is identified.

Continuing with the discussion of FIG. 2A, if no network disruption is detected, then in step 210, a copy of data associated with the VM (also referred to as portion of the snapshot or a copy of a portion of the snapshot) is sent to a backup storage device. The coordination VM may generate a copy of a portion of the data referenced in the snapshot and/or identified in step 204. The portion may be of a predetermined size, and sent to the backup storage device after the portion of predetermined size is completely copied. This step may be performed after a point in time in which the coordination VM has determined that there is not a network disruption between the coordination VM and the backup storage device. The process may then proceed to step 206.

Returning to step 208, when a network disruption is detected, the process proceeds to step 212. In step 212, a helper VM is generated in a second production host. In one or more embodiment of the invention, the coordination VM generates the helper VM in the second production host. The helper VM may be generated by instructing the second production host to allocate computing resources to a virtual machine that is equipped to perform the functionality of the helper VM described throughout this application.

In step 214, metadata (e.g., in the form of a metadata file) associated with the backup operation and remaining data to be backed up (also referred to as a remaining portion of the snapshot or a copy of a portion of the snapshot) are sent to the helper VM. In one or more embodiments of the invention, the metadata file may reference a point in which the data ceased to be sent to the backup storage. Said another way, the metadata file specifies the current state of the backup operation. The metadata file may then be sent to the helper VM. In addition to the metadata file, the remaining data that is to be sent to the backup storage is sent to the helper VM. In other words, the remaining data associated with the VM referenced in the snapshot is copied and sent to the helper VM.

In step 216, the snapshot is deleted.

FIG. 2B shows a flowchart for consolidating a backup in accordance with one or more embodiments of the invention. The method shown in FIG. 2B may be performed by, for example, a helper VM (142, FIG. 1). Other components of the system illustrated in FIG. 1 may perform the method of FIG. 2B without departing from the invention.

In step 220, a metadata file of the VM is obtained from the production host. The metadata file may be the metadata file sent by the coordination VM in step 214. As discussed above, the metadata file specifies which portions of the snapshot need to be stored in the PMEN.

In step 222, data associated with the VM that is specified in the metadata file is obtained to complete the backup. In one or more embodiments of the invention, the data obtained is a copy of a portion of data associated with a virtual machine. The portion of data may include the remaining data to be transferred to the backup storage device. In one or more embodiments of the invention, the obtained data is stored in persistent memory (PMEM) of the second production host hosting the helper VM.

At this stage, from the perspective of the production host, the backup has been successfully stored. However, a portion of the backup (or snapshot) is stored in the backup storage device while another portion of the backup (or snapshot) is stored in the PMEN. In order to consolidate all portions of the backup in the backup storage steps 224 and 226 are performed.

In step 224, data to be sent to the backup storage device is identified using the VM metadata file.

In step 226, the identified data is sent to the backup storage device. The identified data may be consolidated with the data that was sent to the backup storage device from the first production host.

EXAMPLE

Figure 3A:
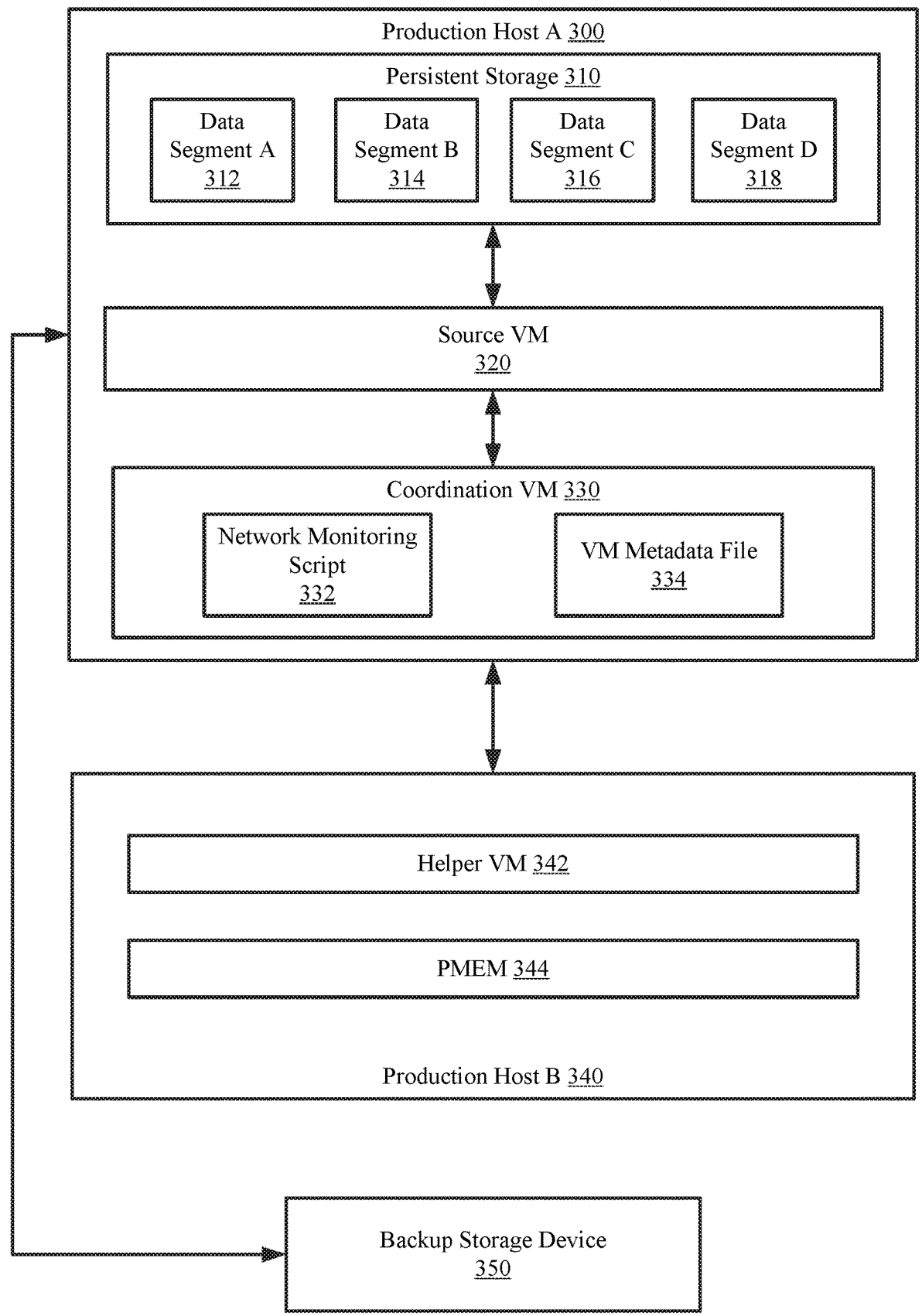
FIGS. 3A-3C show an example in accordance with one or more embodiments of the invention.
Figure 3B:
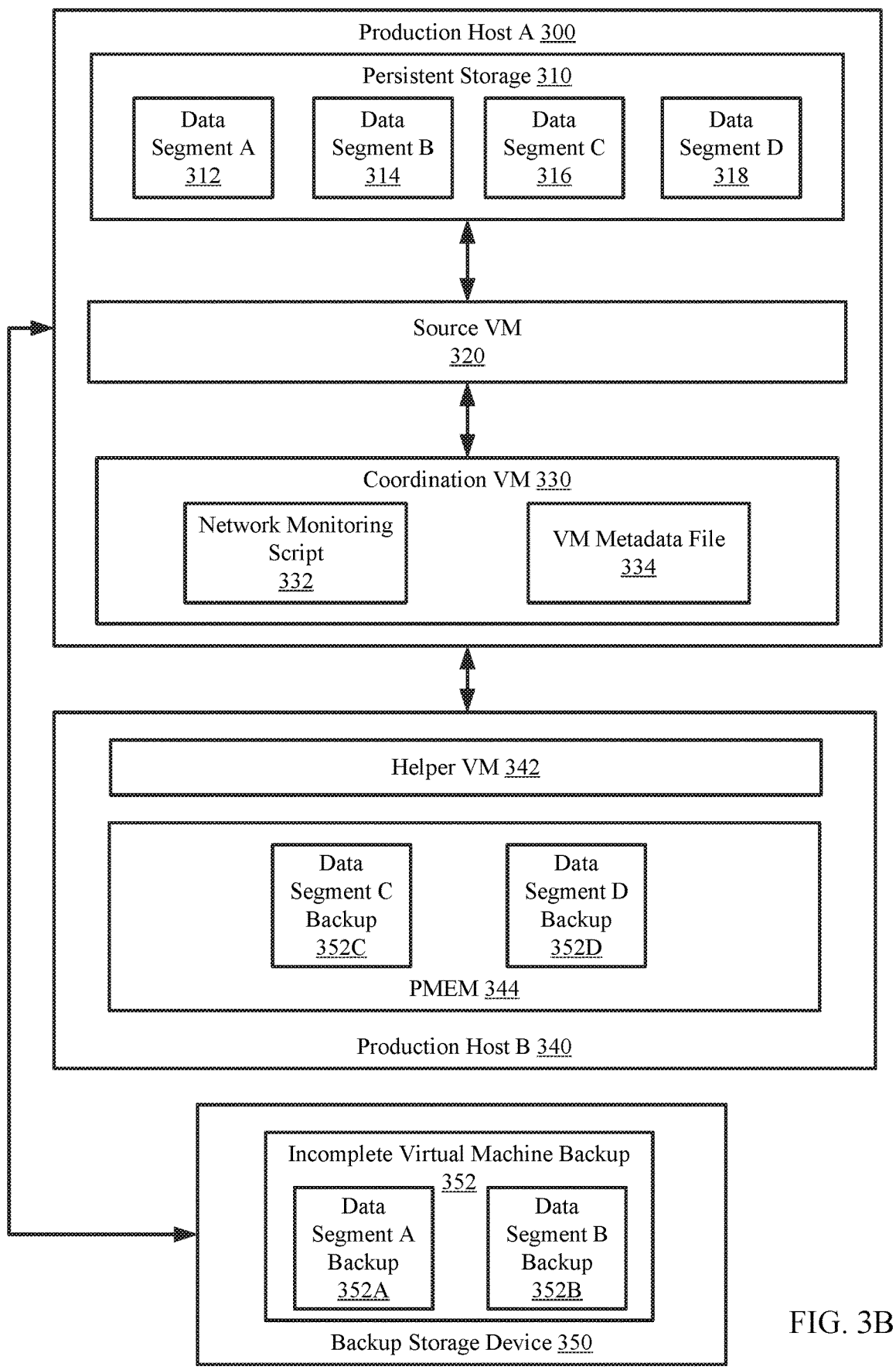
Figure 3C:
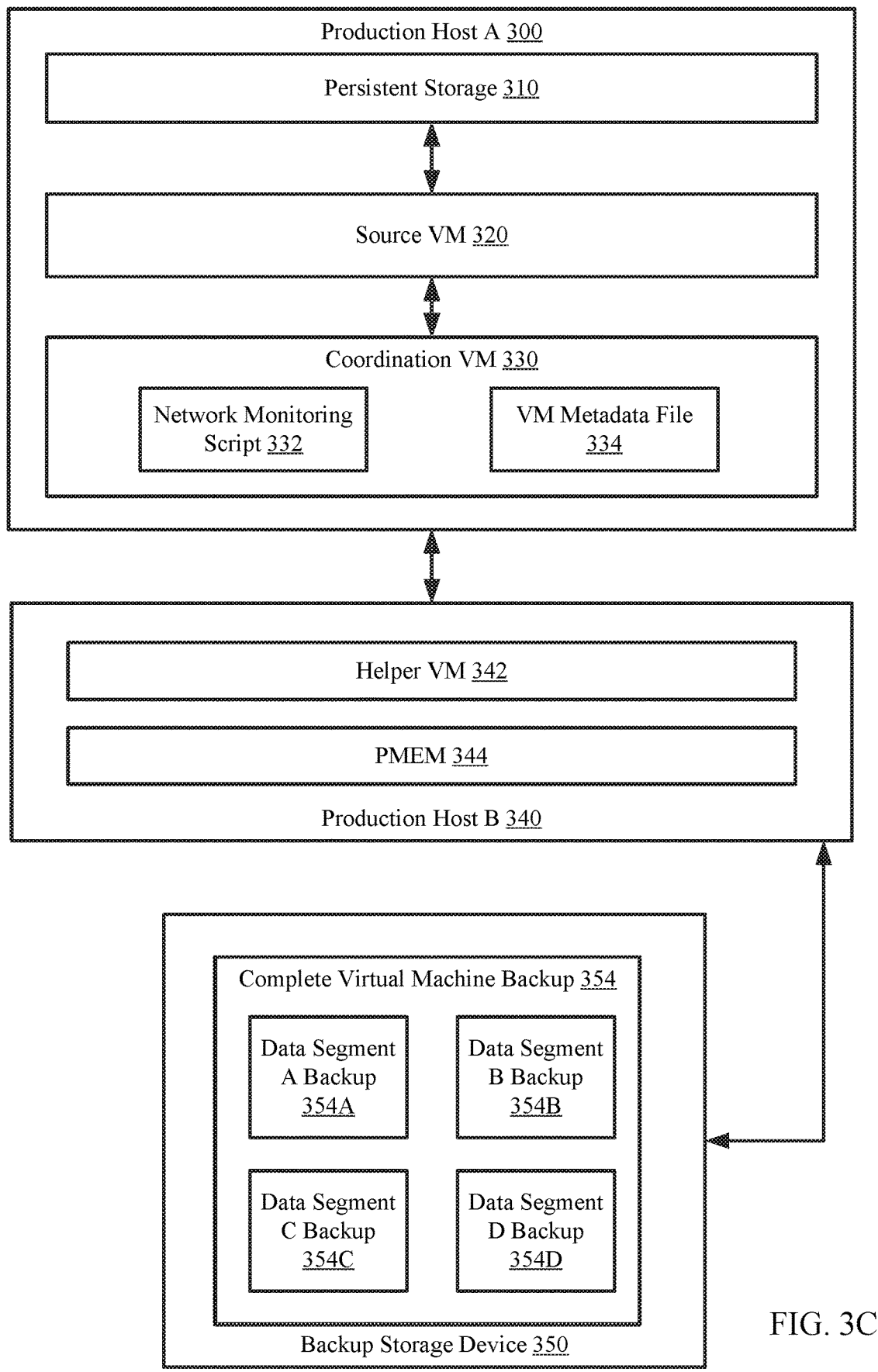

The following section describes an example. The example, illustrated in FIGS. 3A-3C, is not intended to limit the invention. Turning to the example, consider a scenario in which a backup storage request is obtained for a source VM (320). FIG. 3A shows an example system at a first point in time. The source VM (320) may be backed up to a backup storage device (350). A coordination VM (330) may perform the methods of FIG. 2A to perform a backup operation on the source VM (320). The backup operation may include generating a snapshot (not shown) of the VM. The snapshot may include references to data segments (312, 314, 316, 318) stored in persistent storage (310). The backup operation may include generating a copy of each data segment (312, 314, 316, 318) and sending the copies of these segments to the backup storage device (350).

FIG. 3B shows the example system at a second point in time. At the second point in time, the coordination VM (330) has sent copies of data segments A and B (312, 314) (referred to as backup data segments (352A, 352B) to the backup storage device (350) before a network disruption is detected. The coordination VM, upon detecting the disruption, (330) sends copies of the remaining data segments C and D (316, 318) to a second production host (340) hosting a helper VM (342). The helper VM (342) may store these data segment backups (352C, 352D) in PMEM (344) storage.

Due to the disruption, the backup storage device (350) is storing an incomplete VM backup (352) with two of the four data segment backups (352A, 352B). The helper VM (342) may perform the method of FIG. 2B to consolidate the backup. The method may include identifying the data to be sent using a VM metadata file (334). The helper VM (342) may identify that data segment backups C and D (352C, 352D) are to be sent to the backup storage device (350).

FIG. 3C shows the example system at a third point in time. In the third point in time, the helper VM (342) has sent the remaining data to the backup storage device. In this manner, the complete backup (354) is stored in the backup storage device.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the time needed to complete a backup operation when there is a network disruption. Embodiments of the invention allow the backup operation to continue while a network disruption between the production host and the backup storage device occurs. During this time, any remaining data may be sent to a helper VM where it will store the remaining data in persistent memory. This may reduce latency between the production host and the backup storage device.

Because virtual machine operations are limited during a backup operation, it is beneficial to reduce the time needed to complete a backup operation. Embodiments of the invention allow the backup operation to be completed during a network disruption instead of waiting for the network disruption to end. In this manner, the production host completes the backup operation sooner and allows the VM to continue operating.

Thus, embodiments of the invention may address the problem of inefficient use of computing resources. This problem arises due to the technological nature of the environment in which backups are generated and remotely stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
  quiescing a virtual machine (VM), wherein the VM is executing on a host;
  generating a snapshot of the VM after the quiescing;
  initiating a backup operation on the snapshot, wherein upon initiation of the backup operation, transmission of the snapshot to a backup storage system is initiated;
  while performing the backup operation for the VM, detecting a network disruption between the host and the backup storage system; and in response to the detection and during the network disruption, initiating generation of a helper VM on a second host;

storing, after the generation of the helper VM, a portion of the snapshot using the helper VM executing on the second host, wherein the portion of the snapshot was not transferred to the backup storage system prior to the network disruption, and wherein the portion of the snapshot is stored in persistent memory of the second host.

2. The method of claim 1, further comprising:

consolidating the portion of the snapshot with a second portion of the snapshot stored on the backup storage system.

3. The method of claim 2, wherein the second portion of the snapshot was stored in the backup storage prior to detecting the network disruption.

4. The method of claim 2, wherein consolidating the portion of the snapshot with the second portion of the snapshot stored on the backup storage system comprises providing, by the helper VM, the portion of the snapshot directly to the backup storage system.

5. The method of claim 1, wherein the network disruption is detected by a coordination VM executing on the host.

6. The method of claim 1, further comprising:

updating a VM metadata file associated with the VM during the backup operation of the VM, wherein the VM metadata file comprises a state of the backup operation.

7. The method of claim 6, wherein storing the portion of the snapshot of the VM comprises identifying the portion of the snapshot using the VM metadata file.

8. A system, comprising:

a processor comprising an integrated circuit; and memory comprising instructions, which when executed by the processor perform a method, the method comprising:

quiescing a virtual machine (VM), wherein the VM is executing on a host;

generating a snapshot of the VM after the quiescing;

initiating a backup operation on the snapshot, wherein upon initiation of the backup operation, transmission of the snapshot to a backup storage system is initiated;

while performing the backup operation for the VM, detecting a network disruption between the host and the backup storage system; and in response to the detection and during the network disruption, initiating generation a helper VM on a second host;

storing, after the generation of the helper VM, a portion of the snapshot using the helper VM executing on the second host, wherein the portion of the snapshot was not transferred to the backup storage system prior to the network disruption, and wherein the portion of the snapshot is stored in persistent memory of the second host.

9. The system of claim 8, the method further comprising:

consolidating the portion of the snapshot with a second portion of the snapshot stored on the backup storage system.

10. The system of claim 9, wherein the second portion of the snapshot was stored in the backup storage prior to detecting the network disruption.

11. The system of claim 9, wherein consolidating the portion of the snapshot with the second portion of the snapshot stored on the backup storage system comprises providing, by the helper VM, the portion of the snapshot directly to the backup storage system.

12. The system of claim 8, wherein the network disruption is detected by a coordination VM executing on the host.

13. The system of claim 8, the method further comprising:

updating a VM metadata file associated with the VM during the backup operation of the VM, wherein the VM metadata file comprises a state of the backup operation.

14. The system of claim 13, wherein storing the portion of the snapshot of the VM comprises identifying the portion of the snapshot using the VM metadata file.

15. A non-transitory computer readable medium comprising computer readable program code, which when executed by a computer processor enables the computer processor to perform a method for performing a backup operation, the method comprising:

quiescing a virtual machine (VM), wherein the VM is executing on a host;

generating a snapshot of the VM after the quiescing;

initiating a backup operation on the snapshot, wherein upon initiation of the backup operation, transmission of the snapshot to a backup storage system is initiated;

while performing the backup operation for the VM, detecting a network disruption between the host and the backup storage system; and in response to the detection and during the network disruption, initiating generation of a helper VM on a second host;

storing, after the generation of the helper VM, a portion of the snapshot using the helper VM executing on the second host, wherein the portion of the snapshot was not transferred to the backup storage system prior to the network disruption, and wherein the portion of the snapshot is stored in persistent memory of the second host.

16. The non-transitory computer readable medium of claim 15, further comprising:

consolidating the portion of the snapshot with a second portion of the snapshot stored on the backup storage system.

17. The non-transitory computer readable medium of claim 16, wherein the second portion of the snapshot was stored in the backup storage prior to detecting the network disruption.

18. The non-transitory computer readable medium of claim 16, wherein consolidating the portion of the snapshot with the second portion of the snapshot stored on the backup storage system comprises providing, by the helper VM, the portion of the snapshot directly to the backup storage system.

19. The non-transitory computer readable medium of claim 15, wherein the network disruption is detected by a coordination VM executing on the host.

20. The non-transitory computer readable medium of claim 15, further comprising:

updating a VM metadata file associated with the VM during the backup operation of the VM, wherein the VM metadata file comprises a state of the backup operation.

\* \* \* \* \*